(No Model.)
E. O. PEASE.
SWEEPING MACHINE.
No. 478,942. Patented July 12, 1892.
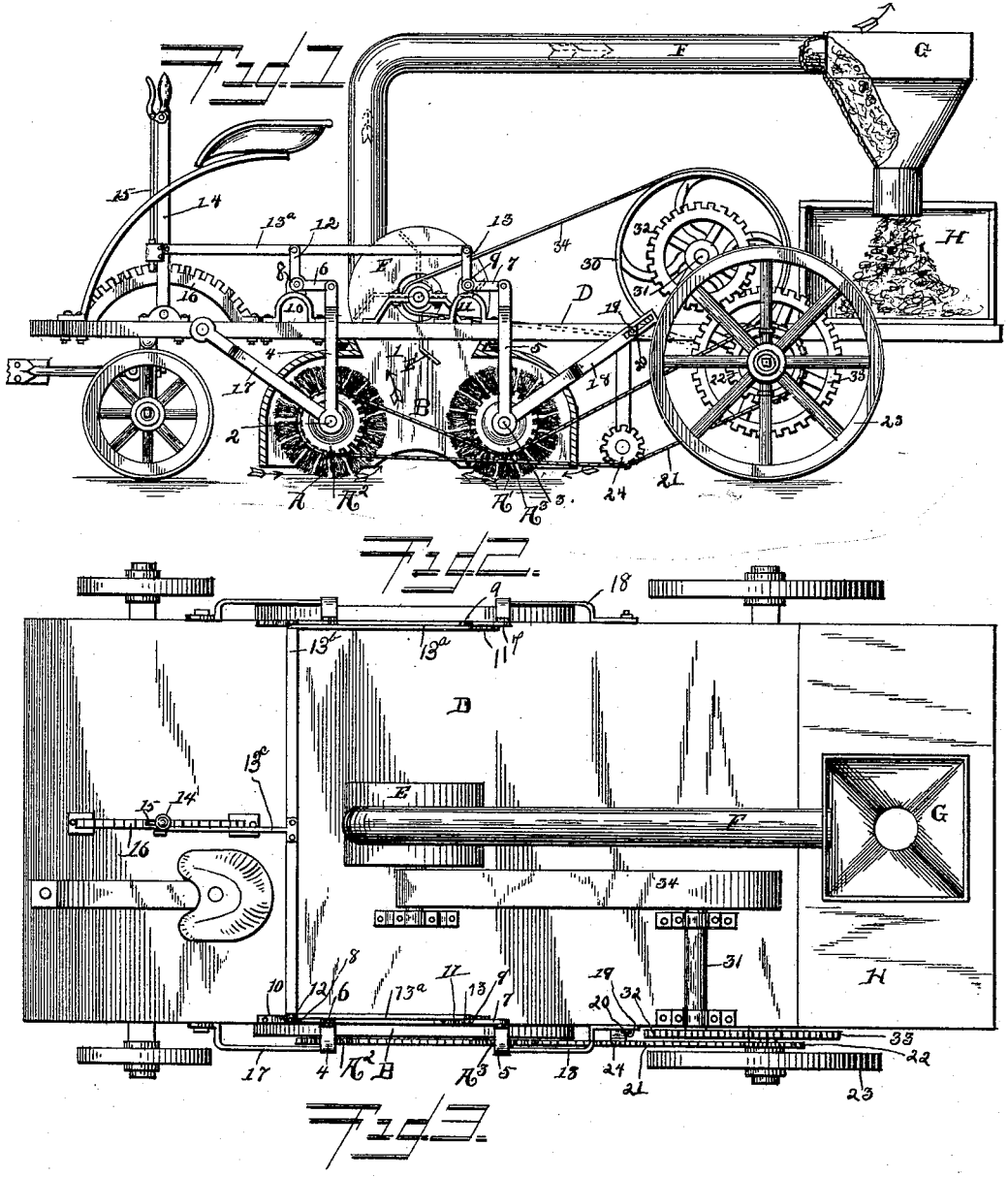
WITNESSES
O. S. Frye
E. C. Ledge
Edwin O. Pease
INVENTOR
W. S. Fitzgerald
Attorneys.

UNITED STATES PATENT OFFICE.

EDWIN O. PEASE, OF JERSEY CITY, NEW JERSEY.

SWEEPING-MACHINE.

SPECIFICATION forming part of Letters Patent No. 478,942, dated July 12, 1892.

Application filed September 18, 1891. Serial No. 406,139. (No model.)

*To all whom it may concern:*

Be it known that I, EDWIN O. PEASE, a citizen of the United States, residing at Jersey City, in the county of Hudson and State of New Jersey, have invented certain new and useful Improvements in Sweeping-Machines; and I do hereby declare the following to be a full, clear, and exact description of the invention, such as will enable others skilled in the art to which it appertains to make and use the same.

My invention has relation to street-sweeping machines; and it consists in the construction and novel combination of parts, as hereinafter fully described, and particularly pointed out in the claim.

In the accompanying drawings, Figure 1 is a side elevation, partly in section, of a street-sweeping machine embodying my improvements. Fig. 2 is a top plan view. Fig. 3 is a perspective view of the housing for the brushes.

Referring by letters and numerals to the accompanying drawings, D designates the platform of the street-sweeping machine, which is mounted upon supporting and guiding wheels, so that it may be conveniently propelled over the surface to be swept. Upon the platform D is supported the dust-receptacle H, over which is supported in any convenient manner the dust-collector G, which is connected with the air-spout F, leading from the fan-chamber E, which is supported by the platform D immediately over the opening 1 in the housing B, covering the brushes A A'. The brush-shafts 2 3 are journaled in the lower ends of hanger-rods 4 5, the upper ends of which are hinged to the rearwardly-projecting arms 6 7 of the bell-cranks 8 9, which are fulcrumed upon bearings 10 11, secured upon the platform D. The upwardly-projecting arms 12 13 of the bell-cranks 8 9 are connected by pitmen $13^a$ with a transverse bar $13^b$, which in turn is connected by a rod $13^c$ with a lever 14, provided with a spring-actuated detent 15, which engages with the teeth of an arc rack 16 and holds the brushes to their adjustments. Inclined link-rods 17 are pivoted at their upper ends to the platform of the carriage, and their lower ends encircle the shaft of the front brush A of the sweeper, while inclined link-rods 18 engage the shaft of the rear brush A' and are slotted near their upper ends to receive laterally-extending threaded bolts 19, to which they are adjustably fixed by burrs or nuts, as 20. This means for adjusting the brushes compensates for the wear on the bristles. The brushes A A' are provided with sprocket-wheels $A^2$ $A^3$, which are connected by a sprocket-chain 21, which is driven by a sprocket-wheel 22 on the main driving-wheel 23. The sprocket-chain 21 passes under an idle sprocket-wheel 24 and under the sprocket-wheel $A^3$, and then around the sprocket-wheels 22 and $A^2$, so that the brushes are revolved toward each other in the direction indicated by the arrows in Fig. 1. This movement of the brushes sweeps the dust and dirt beneath the opening 1 in the housing B, where it is drawn upwardly by the suction-fan E' and forced up through the air-spout and into the dust-collector G, whence it passes into the dust-receptacle H, from which it can be emptied at any desired or convenient point of deposit. The suction-fan E' is driven from a pulley 30 on a shaft 31, provided with a toothed wheel 32, the teeth of which mesh with the toothed wheel 33, attached to the driving-wheel, so that the fan is revolved very rapidly to create the necessary suction to carry the dust up and deposit it in the dust-collector. The pulley 30 is connected with a pulley on the fan-shaft by an endless belt 34, so that the necessary motion may be imparted to the fan as the machine is drawn along.

Having thus fully described my invention, what I claim as new, and desire to secure by Letters Patent, is—

In a street-sweeping machine, substantially as described, the combination, with the platform mounted on supporting and guide wheels, the brush-carrying shafts, and a suitable means for rotating said shafts, of the bell-crank levers mounted on bearings upon the platform above the brush-carrying shafts, the hanger-rods connected at one end to the brush-carrying shafts and at their opposite ends to one branch of the bell-crank levers, the link-rods 17 18, pivotally connected at their upper ends to the platform and at their lower ends to the brush-carrying shafts, the pitmen connected to the vertically-disposed branches of the bell-crank levers, the transverse bar connecting the forward ends of said pitmen and having a forwardly-extending branch, a hand-lever connected to the forwardly-extending branch of the transverse bar, and a suitable means for adjustably fixing said lever, substantially as and for the purpose set forth.

In testimony whereof I affix my signature in presence of two witnesses.

EDWIN O. PEASE.

Witnesses:
CHARLES F. SCHUELER,
WILLIAM ALLEN.